May 21, 1968 P. FROGET 3,384,519
METHOD FOR PRODUCING A CONTINUOUS CLOTH AND
MACHINE FOR CARRYING OUT THE SAME
Filed Oct. 23, 1964 3 Sheets-Sheet 1
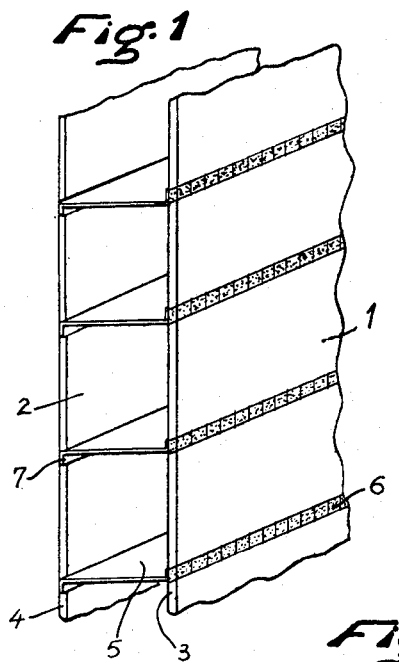
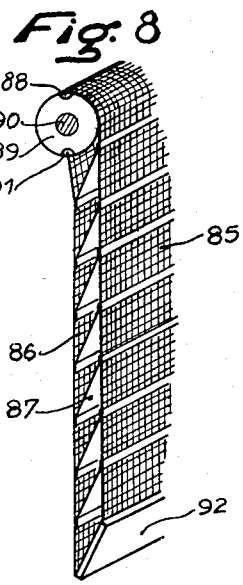
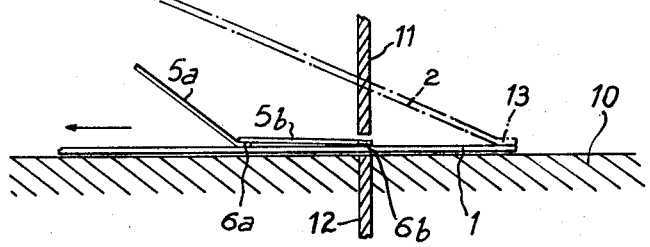
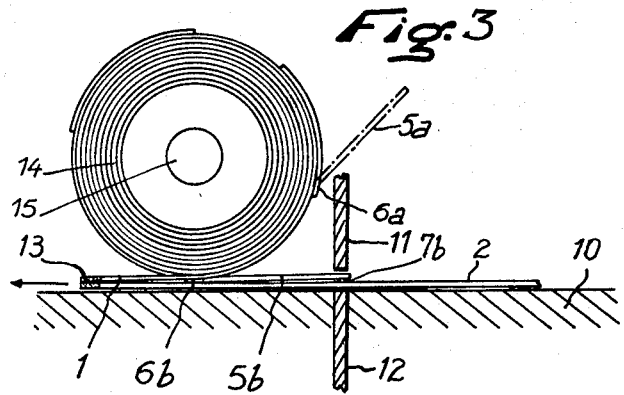
INVENTOR
PIERRE FROGET
By Linton and Linton
ATTORNEYS

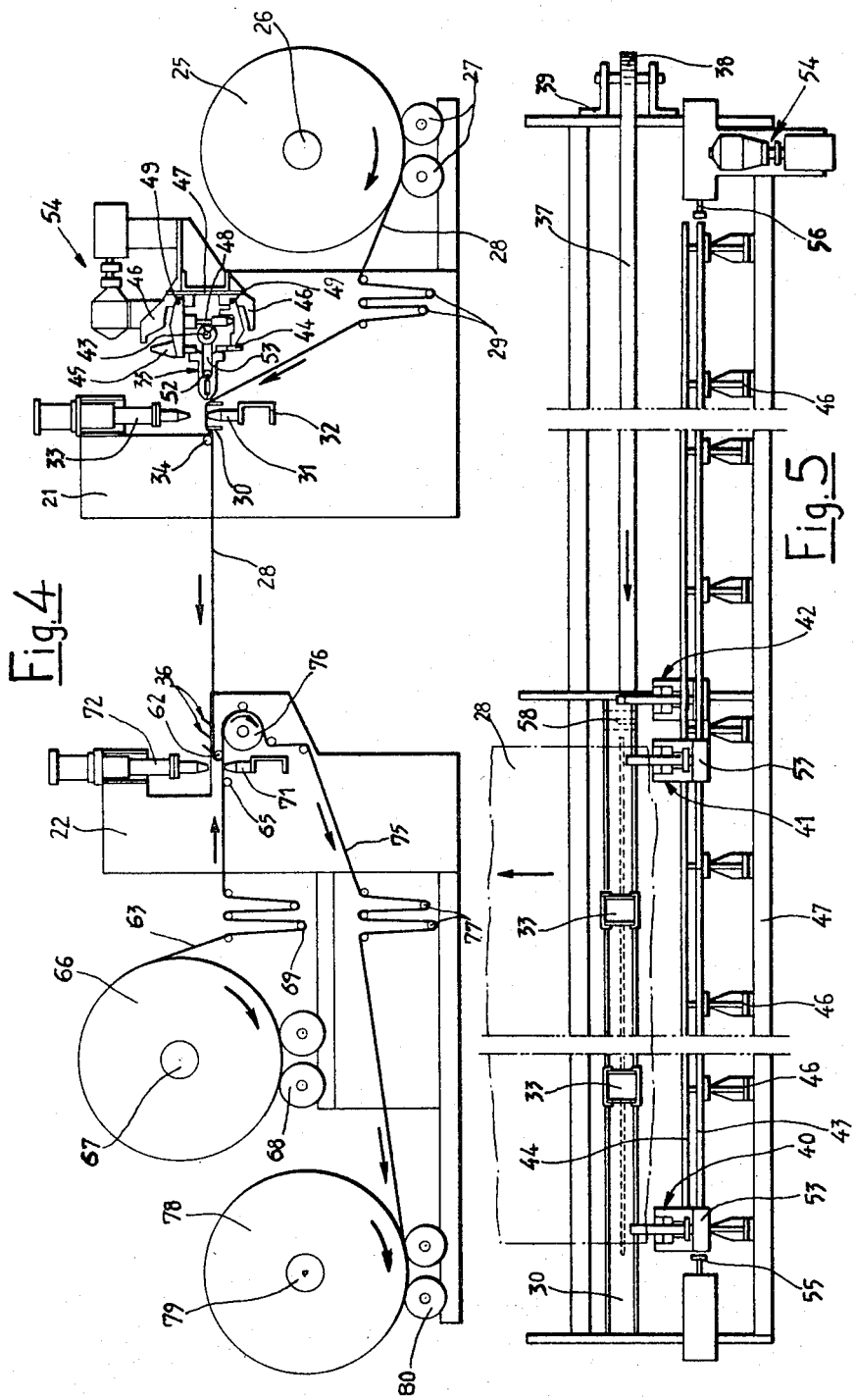

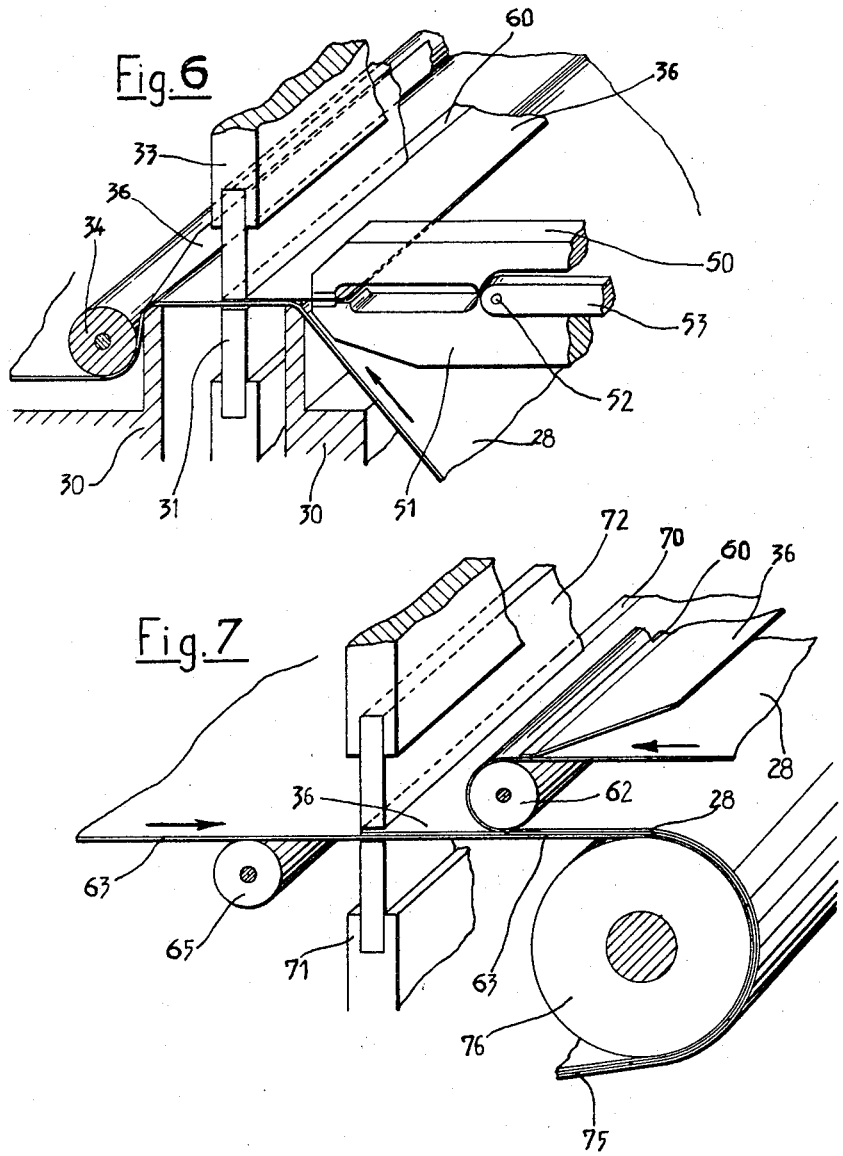

United States Patent Office 3,384,519
Patented May 21, 1968

3,384,519
METHOD FOR PRODUCING A CONTINUOUS CLOTH AND MACHINE FOR CARRYING OUT THE SAME
Pierre Froget, Nemours, France, assignor to "Griesser AG," Aadorf, Thurgovil, Switzerland, a company
Filed Oct. 23, 1964, Ser. No. 406,072
Claims priority, application France, Oct. 28, 1963, 952,003
5 Claims. (Cl. 156—65)

ABSTRACT OF THE DISCLOSURE

The present invention is directed to a method and machine for producing a composite cloth having two superimposed layers of cloth joined by moveable parallel blades with one marginal edge of the blades attached to a first layer of cloth, a second marginal edge of the blades being attached to a second layer of cloth, said blades extending in the same direction parallel to one another but spaced apart and said layers of cloth and blades being made of yarns of thermoplastic material.

---

The method for producing a continuous composite cloth consists in presenting two superimposed layers of cloth which are joined together from place to place by parallel blades the marginal edges of which are respectively fastened to the superimposed layers of cloth so that, when the composite cloth is finished, the two superimposed layers of cloth may slide one upon the other by moving away one from the other by the width of the blades which are assembled between them. The material used for the superimposed layers of cloth and the parallel blades includes a thermoplastic material which can be welded when heated, covering a core made of glass yarns, of synthetic yarns such as those known under the names of "Dacron," "Terylene," or "Tergal," or made of natural wires, and the parallel blades are connected with the superimposed layers by welding.

The method for obtaining a composite cloth according to the present invention consists in welding only one marginal edge of the blades upon one face of a first cloth layer, with these blades extending in the same direction parallel to one another, winding this first layer provided with the said blades, into a reel, then returning this first layer reel so that the free edge of the blades might come into contact with a second cloth layer, welding the free marginal edges of the blades upon said second cloth layer and then winding the composite cloth thus made up into a reel.

This method can be carried out very simply without resorting to complicated and expensive fittings. For instance, the various steps of welding, winding and returning the elements can be operated by hand, which constitutes a first embodiment of the invention.

Of course, this manual application of the process, while being less expensive for small work, does not provide the maximum efficiency required by mass production. In that case, an automatic machine will rather be used.

The automatic machine for carrying out this process with a satisfactory efficiency constitutes a second embodiment of the invention and it includes a first welding station, supplied with the first cloth layer and supplied also with blades which are fed to the said welding station by moveable clamps moving forward upon a fixed frame transversely to the direction to which the first layer advances, each blade being cut by a shear cutter at an adequate length and held in position during the welding step by the said moveable clamps, and then welded on one marginal edge. The machine also includes a second welding station fed on the one hand, with the first cloth layer, to which the blades were welded, and on the other hand, with the second cloth layer which unwinds for coming next to the first cloth layer so that the free marginal edges of the blades might come into contact with the said second cloth layer and be welded thereto, and the composite cloth once finished being wound into a reel.

Other features and advantages of the present invention will appear from the following description of the two forms of execution of the present invention with reference to diagrammatic annexed drawing in which:

FIGURE 1 is a perspective view of a composite and finished cloth obtained by means of the method of the present invention;

FIGURE 2 is a cross-sectional view showing a first step in one embodiment of the invention;

FIGURE 3 is a cross-sectional view showing the second step of the embodiment shown in FIGURE 2;

FIGURE 4 is a diagrammatic side view of a complete plant for obtaining the composite cloth according to a second embodiment of the invention;

FIGURE 5 is a top view on a larger scale of the first welding station in the plant to that shown in FIGURE 4;

FIGURE 6 is a perspective view on a larger scale showing the detail of the welding device in the first welding station of the plant;

FIGURE 7 is a perspective view showing the detail of the welding device in the second welding station of the plant; and FIGURE 8 shows a particular example of the use of the composite cloth produced according to the invention.

Referring to FIGURE 1, the composite cloth once finished consists of a first cloth layer or sheet 1 made of yarns, such as glass yarns, synthetic yarns such as "Dacron" or "Tergal" or natural wires covered with thermoplastic material which can be welded when heated, and of a second cloth layer or sheet 2 similar to the first cloth layer 1. The longitudinal marginal edges of the cloth layers or sheets 1 and 2 are reinforced by blades or strips of thermoplastic material, respectively 3 and 4, welded to the yarns constituting the elements in order to keep them from unlinking and to improve the appearance. Such welding consists of ensuring by a temporary fusing the junction of the covering of thermoplastic material of the cloth layers 1 and 2 and strips 3 and 4. The layers 1 and 2 are connected by inclinable blades 5 the marginal edges of which are respectively welded at 6 and 7 to the cloth sheets 1 and 2. These blades 5 are preferably made of the same material as the sheets 1 and 2 so as to get a perfect welding.

The method for the manual making of the composite cloth is shown in FIGURES 2 and 3. The table 10 of a welding machine is shown including an upper electrode 11 and a lower one 12 which permits the desired welding. During the first step, a cloth layer is disposed on table 10 which will be the sheet 1 of the FIGURE 1 when the composite cloth is finished. The electrodes 11 and 12 of the welding machine being fixed, the inclinable blades are welded beginning with the extremity of the layer 1 which is on the left as viewed in FIGURE 2, with the layer 1 being carried along in the direction of the arrow. In the drawing, the welding machine is shown executing the welding of an inclinable blade 5b. As can be seen, the preceding blade 5a was already welded on its marginal edge at 6a.

The composite cloth having been moved forwardly in the direction of the arrow after the blade 5a has been welded, this blade 5b is arranged in such a manner that its longitudinal edge which is remote from the electrodes 11 and 12 override on the welding connexion of the blade 5a. The blade 5b is then welded along the line 6b. As shown, the free ends of the blades 5a, 5b are found above the layer 1.

The layer 1 is further moved forward and provided with other blades until its end is between the electrodes 11 and 12. As shown in dotted line, the layer 1 and the blades 5a and 5b are then covered with a second layer which, when the composite cloth is finished, will be the sheet 2 of FIGURE 1, and when the extreme edges of these layers 1 and 2 are both between the electrodes 11 and 12, they are welded together.

So as to weld the free marginal ends of the inclinable blades 5a, 5b to the layer 2, the layer 1 must then be wound into a reel, with the blades 5 being on the periphery of the reel 14 thus formed and the free ends of the blades 5 being able to separate from the reel 14 as can be seen in dotted line in FIGURE 3 for the blade 5a.

The reel is thus placed on the welding machine above the table 10 and on the left of the vertical plane of the electrodes 11 and 12 according to FIGURE 3, while the layer 2 is stretched on the table 10, with the ends of the layers 1 and 2 whelded at 13 being as shown in FIGURE 3. The reel 14 can freely turn around an axle 15 which is able to move down progressively during the unwinding of the reel 14 so that the layers 1 and 2 will always be in contact along the lower generatrix of the cylindrical reel 14. This is necessary in order that the inclinable blades 5 set themselves correctly with their entire surface against the layer 2 in order to avoid the inclinable blades making inopportune folds. As represented in FIGURE 3, the reel 14 is in a position for beginning the unwinding and the first inclinable blade 5b already is welded at 6b to the layer 1 in contact with the layer 2. The free end of the blade 5b is placed between the electrodes 11 and 12 which weld it at 7b to the layer 2. The layers 1 and 2 are drawn in the direction of the arrow of the FIGURE 5, the reel 14 comes slightly unwound and the inclinable blade 5a comes in its turn into contact with the layer 2 to which it is welded.

Referring to FIGURE 4, an automatic machine will be now described. This machine includes a first welding station 21 and a second one 22. On the frame of the welding station 21 is placed a reel 25 around which a first layer of cloth is wound, with this reel being able to rotate freely about its axle 26 in the direction pointed out by the arrow. Rollers 27 placed under the reel 25 allow a regular unwinding of the first layer of cloth 28 the tension of which is maintained by tension rollers 29. The first cloth layer 28 goes on to the welding table 30 of the welding station 21, between a lower fixed electrode 31 supported by a beam 32 and an upper movable electrode 33 (shown on the drawing in a position moved away from the electrode 31) which comes into contact with the first cloth layer 28, when it is time for welding.

The tension of the cloth layer 28 on the welding table is ensured by a tension roller 34.

A set of clamps pointed out in general at 35 is connected up ahead of the soldering post 21 and allows to bring on to the welding table 30 a strip 36 to be welded (see FIGURE 5) the width of which is small and the length identical to the width of the cloth layer 28. This strip 36 to be welded is separated from a tape 37 wound into a reel 38 being able to rotate freely in bearings 39 fixed on the side of the welding station 21, so that the tape might move forward according to the arrow of FIGURE 5, perpendicularly to the direction where the first cloth layer 28 moves forward. The set of clamps 35 includes gripping clamps 40 and 41 gripping the tape 37 which move forward, upon a horizontal rail 43 parallel to the welding table 30. The clamp 42 is fixably mounted on the frame of the welding table and under the rail 42 will in order that said clamp 42 not prevent the movable clamps 40 and 41 from moving.

The opening and the closing of the clamps 40 and 41 are controlled by transverse lower control arm 44 and upper control arm 45, said control arms being pivoted in 49 on brackets 46 fixed on a fixed vertical frame 47 extending transversally beyond the welding table 30 so that the clamps leave it wholly free. The control arms 44 and 45 are operated by a driving means such as a hydraulic or pneumatic actuator being able to separate and to bring the control arms 44 and 45 together.

The ends of the control arms 44 and 45 act upon the upper jaw 50 and lower jaw 51 which compose each of the clamps 40 and 41, having them pivot one relative to the other about a horizontal axle 52 integral with a clamp-holder 53 mounted so as to be able to move by slipping along the fixed rail 43 under the impulse of a motor unit 54 secured on the fixed frame 47.

The stroke of the clamps is limited at each end of the rail 43 by adjustable abutments 55 and 56. Clamps 40 and 41 can be moved bodily whereas the fixed clamp 42 is independent, i.e., the control of the jaws of clamp 42 is independently operated.

On the left of the clamp 42 is placed an automatic cutting means which permits separating the tape 37 from the blade 36, so as to be welded on the first cloth layer 28.

In the welding step, the clamps 40 and 41 hold tight the cut up blade 36 to be welded, and the free end of the tape 37 is maintained by the clamp 42.

When the welding step is finished on the table 30, the clamps 40 and 41 open and move forward to the right of FIGURE 5 so as to take again a new length of tape 37. Then the clamp 42 opens and the clamps 40 and 41 are moved again towards the left so that they should come to the position of FIGURE 5. Simultaneously the cloth layer 28 has moved suitably forward and the new blade 36, after being cut by the cutting means 58, can be welded to cloth layer 28 by having the electrodes 31 and 33 come into the welding position shown in FIGURE 5. A welding line 60 is thus realized.

After this first welding step, the cloth layer 28 provided with the blades 36 enters into the second welding station 22 by passing round a roller 62 placed near the electrodes of the second welding station.

The second welding station is supplied with a second cloth layer 63 identical with the first cloth layer 28 and having the same size but moving forward in an opposite direction. This second cloth layer 63 passes over a support-roller 65 before moving about upon the welding table, with said second cloth layer 63 unwinding from a reel 66 rotating freely on an axle 67 (in the direction of the arrow of FIGURE 4) supported by the frame of the second welding station. Supporting rollers 68 ensure the regular unwinding of the cloth layer and tension rollers 69 ensure the tension of it.

The welding 70 of the second marginal edge of a blade 36 is carried out when the blade 36 lies closely upon the second cloth layer 63, with the free marginal edge of the blade 36 then being between the lower and the upper electrodes 71 and 72 respectively of the second welding station.

The welding once finished, the entire cloth 75, including the two superimposed layers 28 and 63 and the blades 36 inserted between them, passes upon a cylinder 76 and, after being tightened by tension rollers 77, it is wound into a reel 78 which rotates on an axle 79 and runs on rollers 80.

It will be understood that the operations of the control means will be all synchronized. Before the starting of the machine the first cloth layer 28 will pass alone in the first and second welding stations, and its winding on the reel 78 will be initiated and then the free end of the second cloth layer 36 will be driven between the electrodes 71 and 72 of the second welding station. Then the starting is ready to operate. The reel 78 will be the only one drawn into rotation by a motor set (not shown) and the rolling up of the composite cloth will control the synchronized and regular unwinding of reels 25 and 66 which will ensure a smooth working of the machine.

The composite cloth obtained by the method of the invention can have various applications such as, for instance, the use for tents with "double roof" or particularly blinds such as the one diagrammatically shown in FIGURE 8.

In that particular case, the blind is made of two cloth sheets 85 and 86 with a wide or open weaving so as to constitute transparent elements that let the light pass through, with the meshes of the cloth being designed in order to be opposed to the passage of insects and mosquitoes.

The two transparent elements 85 and 86 are put together by moveable and opaque blades 87 parallel to one another and regularly separated and welded in the way above mentioned. The sheet 85 is fixed in 88 according to a generatrix of a drum 89 rotating on an axle 90, and the element 86 is fixed in 91 according to a diametrally opposed generatrix of the drum 89. The free ends of the transparent cloths are connected by a rigid small plate 92 parallel to the opaque blades 87.

Thus, when the drum 89 is rotated in order to put the blind in the position of FIGURE 8, the transparent sheets 85 and 86 are superimposed, and the opaque blades 87 are pivoted so as to come in a vertical position between the transparent sheets 85, 86, which prevents the light from passing through.

It will be easily understood that, when the drum 89 has been rotated in order to bring the connections 88 and 91 in a horizontal plane, the sheets 85 and 86 being then moved away one from the other to a maximum distance, the blades 87 are horizontal, and that accordingly the light can freely pass through. This blind permits the regulation of the light penetrating into a dwelling place. It will be easily understood that the present description is not restrictive and that various details of construction may be changed without departing from the scope of the invention, as defined by the following claims.

What I claim is:

1. A method for producing a composite cloth having, when finished, two superimposed layers of cloth joined at spaced apart positions therealong by means of moveable parallel blades, said layers of cloth and blades being made of yarns of thermoplastic material, said method consisting in welding upon one face of a first layer of cloth only one marginal edge of the blades which are directed in the same direction and parallel to one another, then in returning said first layer of cloth thus provided with said blades so that the free marginal edges of said blades come into contact with the second layer of cloth, welding said free marginal edges of said blades upon the second layer of cloth and then rolling up the composite cloth thus made.

2. A machine for producing a composite cloth of two superimposed layers of cloth joined by moveable blades comprising a first welding station for welding only one marginal edge of said blades to a first layer of cloth and a second welding station for welding the fire marginal edges of said blades to a second layer of cloth, means for feeding said first welding station with a first layer of cloth and with said blades to be welded to said first layer of cloth, and means for feeding said second welding station with said first layer of cloth provided with said welded blades and with a second layer of cloth upon which the free marginal edges of said blades are to be welded.

3. A machine for producing a composite cloth of two superimposed layers of cloth joined by moveable blades comprising a first welding station, said first welding station having a fixed frame, a reel for a first layer of cloth being freely mounted on said fixed frame in order to be unwound, a welding table including fixed lower electrode and moveable upper electrode and a set of clamps transversally and moveably mounted on said fixed frame, a reel for a tape and a shearing means for cutting said tape into separate blades and a second welding station having a fixed frame, a welding table with a fixed lower electrode and a moveable upper electrode, a reel for a second layer of cloth freely mounted on said fixed frame in order to be unwound, a cylinder for returning said first layer of cloth coming to said second station before reaching said electrodes of said second station, and a final reel upon which is rolled the composite cloth when finished.

4. A machine for producing a composite cloth of two superimposed layers of cloth joined by moveable blades comprising a first welding station, said first welding station having a fixed frame, a reel for a first layer of cloth freely mounted on said fixed frame in order to be unwound, a welding table including electrodes, a reel for a tape, a set of clamps transversally and moveably mounted on said fixed frame for gripping and bringing said tape into contact with said first layer of cloth on said welding table and a shearing means for cutting said tape at a determined length, after being welded by an edge on said first layer of cloth by means of said electrodes, and a second welding station having a second fixed frame, a second welding table with electrodes, a reel for a second layer of cloth freely mounted on said second fixed frame in order to be unwound for feeding said second welding table, a cylinder for returning said first layer of cloth in order to bring into contact the free marginal edges of the blades wleded on said first layer of cloth with said second layer of cloth and a final reel upon which is rolled the composite cloth when finished.

5. A machine for producing a composite cloth of two superimposed layers of cloth joined by moveable blades comprising a first welding station, said first welding station having a fixed frame, a reel for a first layer of cloth freely mounted on said fixed frame in order to be unwound, a welding table including electrodes, a reel for a tape, a set of clamps transversally and moveably mounted on said fixed frame for gripping and bringing said tape into contact with said first layer of cloth on said welding table and a shearing means for cutting said tape at determined length, and a fixed clamp for holding the free end of said tape when it is cut by said shearing means and a second welding station having a second fixed frame, a second welding table with electrodes, a reel for a second layer of cloth freely mounted on said second fixed frame in order to be unwound for feeding said second welding table, a cylinder for returning said first layer of cloth in order to bring into contact the free marginal edges of the blades welded on said first layer of cloth with said second layer of cloth whereby said free marginal edges of the blades contact with said second layer can be welded by said electrodes of said second welding table of the second welding station and a final reel upon which is rolled the composite cloth when finished.

References Cited
UNITED STATES PATENTS

| | | | |
|---|---|---|---|
| 2,714,413 | 8/1955 | Hunter et al. | 156—552 X |
| 2,856,324 | 10/1958 | Janowski | 156—65 |
| 3,119,920 | 1/1964 | Mayhew | 156—583 X |

EARL M. BERGERT, *Primary Examiner.*

M. L. KATZ, *Assistant Examiner.*